(12) United States Patent
Renard et al.

(10) Patent No.: US 10,017,022 B2
(45) Date of Patent: *Jul. 10, 2018

(54) FUNCTIONAL HYDRO-ELASTIC ELEMENT AND HYDRO-ELASTIC JOINT

(71) Applicant: ANVIS SD FRANCE S.A.S., Decize (FR)

(72) Inventors: Franck Renard, Saint Eloi (FR); Gérard Jandot, Nevers (FR)

(73) Assignee: ANVIS SD FRANCE S.A.S., Decize (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/235,556

(22) Filed: Aug. 12, 2016

(65) Prior Publication Data
US 2016/0361964 A1    Dec. 15, 2016

Related U.S. Application Data

(63) Continuation of application No. 13/517,475, filed as application No. PCT/EP2010/007578 on Dec. 13, 2010, now Pat. No. 9,416,844.

(30) Foreign Application Priority Data

Dec. 22, 2009 (FR) ..................... 09 59423

(51) Int. Cl.
*F16F 7/00* (2006.01)
*F16F 13/14* (2006.01)
(Continued)

(52) U.S. Cl.
CPC .............. *B60G 15/06* (2013.01); *F16F 9/346* (2013.01); *F16F 13/14* (2013.01); *F16F 9/3207* (2013.01)

(58) Field of Classification Search
CPC ........ F16F 7/00; F16F 9/00; F16F 9/10; F16F 9/14; F16F 9/3207; F16F 9/34;
(Continued)

(56) References Cited

U.S. PATENT DOCUMENTS 2,155,919 A    4/1939    Wooler et al.
6,273,406 B1    8/2001    Miyamoto et al.
(Continued)

FOREIGN PATENT DOCUMENTS

DE    102007021628 A1    11/2008
EP    0410455 A1    1/1991
(Continued)

OTHER PUBLICATIONS

Chinese Patent Office, Chinese Patent Application No. 2010800589270, Office Action dated Dec. 2, 2013 with English translation, 14 pages.
(Continued)

*Primary Examiner* — Melody M Burch
(74) *Attorney, Agent, or Firm* — Dennis J. Williamson; Moore & Van Allen PLLC

(57) ABSTRACT

The invention relates to a functional hydro-elastic element to be lodged in a hydro-elastic joint for damping load vibrations between two structural parts, in particular a wheel suspension and a vehicle body, the functional hydro-elastic element having a longitudinal axis and a circumferential direction around this longitudinal axis. The functional hydro-elastic element has at least one row of hydraulic chambers, extending circumferentially and comprising at least three hydraulic chambers and at least one throttling duct that enables a communication of liquid between each pair of respective circumferentially adjacent hydraulic chambers so that a variation of at least one working volume of the hydraulic chambers due to load vibrations can be
(Continued)

balanced by enabling a flow of liquid into at least one of the other hydraulic chambers.

13 Claims, 8 Drawing Sheets

(51) Int. Cl.
   *B60G 15/06* (2006.01)
   *F16F 9/346* (2006.01)
   *F16F 9/32* (2006.01)

(58) Field of Classification Search
   CPC .. F16F 9/346; F16F 13/14; F16F 15/00; F16F 15/023; F16F 15/16; F16F 2222/12; F16C 27/00; F16C 27/06; B60G 15/06
   See application file for complete search history.

(56) References Cited

U.S. PATENT DOCUMENTS

| | | |
|---|---|---|
| 6,622,996 B2 | 9/2003 | Mayerbock |
| 6,883,967 B2 | 4/2005 | Robb et al. |
| 7,500,788 B2 | 3/2009 | Joyner et al. |
| 9,416,844 B2 * | 8/2016 | Renard .................. F16F 13/14 |
| 2002/0081050 A1 | 6/2002 | Cermak |
| 2003/0178754 A1 | 9/2003 | Larmande et al. |
| 2007/0018369 A1 | 1/2007 | Hartmann et al. |

FOREIGN PATENT DOCUMENTS

| | | |
|---|---|---|
| EP | 1348885 A1 | 10/2003 |
| EP | 1645774 A1 | 4/2006 |
| FR | 2659713 A1 | 9/1991 |
| FR | 2817007 A1 | 5/2002 |
| FR | 2910577 A1 | 6/2008 |
| GB | 2351138 A | 12/2000 |
| JP | 60168931 A | 9/1985 |
| WO | 2008074507 A1 | 6/2008 |

OTHER PUBLICATIONS

Chinese Patent Office, Chinese Patent Application No. 2010800589270, Office Action dated Jul. 16, 2014 with English translation, 5 pages.
European Patent Office, International Patent Application No. PCT/EP2010/007578, International Search Report and Written Opinion, dated Jan. 20, 2011.
European Patent Office, International Patent Application No. PCT/EP2010/007578, International Preliminary Report on Patentability and Written Opinion, dated Aug. 7, 2012.
U.S. Appl. No. 13/517,475, Office Action, dated Sep. 11, 2014.
U.S. Appl. No. 13/517,475, Final Office Action, dated Mar. 25, 2015.
U.S. Appl. No. 13/517,475, Office Action, dated Jul. 16, 2015.

* cited by examiner

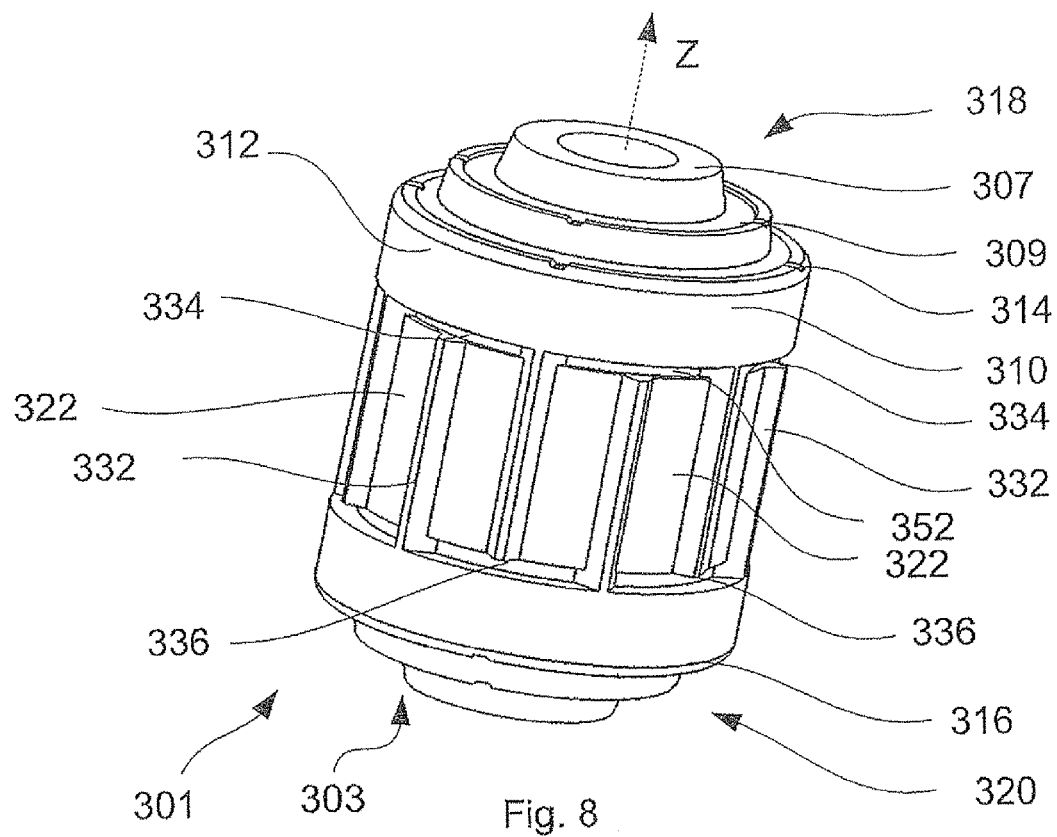
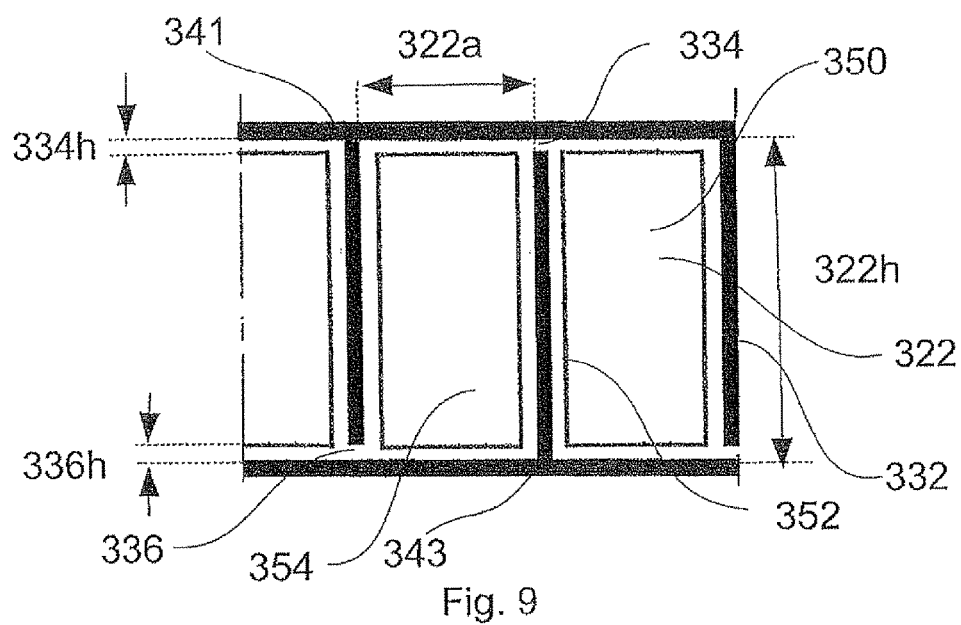

FUNCTIONAL HYDRO-ELASTIC ELEMENT AND HYDRO-ELASTIC JOINT

CROSS-REFERENCE TO RELATED APPLICATIONS

This application is a continuation of U.S. application Ser. No. 13/517,475, filed on Jun. 20, 2012, now U.S. Pat. No. 9,416,844, entitled " FUNCTIONAL HYDRO-ELASTIC ELEMENT AND HYDRO-ELASTIC JOINT", the contents of which is hereby incorporated by reference herein in its entirety ,which was filed under the provisions of 35 U.S.C. § 371 and claims the benefit of International Patent Application No. PCT/EP2010/007578, filed on Dec. 13, 2010, entitled "HYDROELASTIC FUNCTIONAL ELEMENT AND HYDROELASTIC JOINT", which claims the benefit of priority of French Application No. 0959423, filed on Dec. 22, 2009, the contents of both of which are hereby incorporated by reference herein in their entirety.

BACKGROUND

The invention relates to a functional hydro-elastic element to be lodged in a hydro-elastic joint for damping load vibrations between two structural parts, in particular a wheel suspension and a vehicle body, the functional hydro-elastic element having a longitudinal axis and a circumferential direction around this longitudinal axis. Besides, the invention relates to a hydro-elastic joint for assembling two structural parts, in particular to connect a wheel suspension to a vehicle body, the joint comprising a longitudinal axis, a rigid external frame, a rigid internal frame, and a functional hydro-elastic element linking the internal frame to the external frame in a vibration-damping manner.

In particular, the invention relates to hydro-elastic joints for automobiles or heavy vehicles. In the present case, it more particularly concerns joints, in particular multi-layer joints, for ground connection of wheeled vehicles, wherein the joint has to provide an acoustic filter for structure-borne vibrations. Typically, these joints must have a significant radial stiffness in view of the occurring stresses and of the joints' guiding function; thus, these high stiffnesses facilitate the transmission of noise.

Hydro-elastic mountings or joints are known for many years. These consist generally of at least two cylindrical, concentric frames, the annular space between which is filled with elastomer material in which hydraulic chambers are arranged and linked by channels. The liquid contained in these chambers can circulate from one chamber into the other for low excitation frequencies whereas from a certain frequency onwards an occurring resonance blocks passing of the liquid, which causes a phase shift associated with a dynamic stiffening used for filtering certain vibrations. This technique is explained in various patents such as U.S. Pat. No. 6,273,406.

There are numerous variants of shapes for hydro-elastic joints that can be classified into two families.

The first family comprises hydro-elastic joints having two hydraulic chambers opposite to each other at 180° according to a preferential radial direction corresponding to the principal excitation direction, or four hydraulic chambers opposing each other pairwise according to two radial directions that are orthogonal to each other. This is for example the case for the patent applications EP 1 348 885 and FR 2817007.

The second family comprises hydro-elastic joints designed with a peripheral hydraulic chamber that is continuous but that can locally present throttling areas in the hydraulic circuit. This is for example particularly the case for the patent application FR2 910 577 and the application EP 0 410 455.

The variations in these two families originate either from the two connection principles, one or double layer, or from the way the hydraulic chambers and channels are built, that is with or without an incorporated plastic piece. Finally, there are joints for filtering radial excitations and others for filtering axial excitations with hydraulic effect, wherein the axis is the axis of the cylindrical frames of the joint. Some rare applications provide the ability of filtering with hydraulic effect at the same time in axial and in radial direction. This is the case for the patent application FR 2 659 713 and in certain embodiments of the application FR 2 910 577.

The patent application FR'713 claims to provide hydraulic filtering in all radial directions with four hydraulic chambers. However, the breakdown of stresses it describes does not compensate for the fact that a hydraulic chamber exposed to a load that essentially differs from a radial direction will not be able to eject the hydraulic liquid in the same way as if the load was purely radial, that is perpendicular to the external surface of the hydraulic chamber. Additionally, despite the fact that the four peripheral chambers of the joint disclosed in FR'713 provide filtering in all directions, the level of filtering will not be constant depending on the radial direction, which prohibits mounting such a joint without specific angular orientation.

The patent application FR'577 discloses a continuous and peripheral hydraulic chamber that a priori seems ideal to assure homogenous hydraulic filtering in all radial directions. However, the fluid transfer from an area subjected to an excitation towards a diametrically opposed area is only really controllable if a debit restriction is present at a specific location, as it is also disclosed in the application FR'577. Thus, if during mounting the joint is angularly oriented such that this restricted area is directly above the radial axis of excitation, the flow of liquid will be strongly inhibited and the fluid will have a tendency to be repelled towards the two half-chambers at each side of the restricted area. This generates the risk of creating a phase shift already for low frequencies through blockage of the hydraulic fluid. In order to avoid localised peripheral restrictions, a solution with a hydraulic chamber in the shape of a very thin layer could be considered, as in the application FR'577, but this arrangement is industrially problematic in view of the inevitable tolerances of manufacturing.

Thus, the prior concepts of hydro-elastic joints require a specific orientation for the assembly, that is either angularly because they do not hydraulically filter in an essentially constant manner over all radial directions, or axially because they cannot be mounted head to head, or in both directions because they can only filter either radially or axially.

Furthermore, the frequencies or frequency ranges to be absorbed for a hybrid or electric vehicle are different from the frequency ranges for a vehicle solely driven by a combustion engine. Hybrid vehicles can be driven in parallel or sequentially by an electric motor and a combustion engine. For example, if the hybrid vehicle is driven solely by an electric motor, a driver can hear noises that are normally masked by the noise or the vibration of the combustion engine. For example the noise of a gearbox or of a transmission can be disturbing for a passenger.

SUMMARY

Embodiments disclosed herein may provide a functional hydro-elastic element and a joint that overcomes the inconveniences of the known joints, and in particular may provide a joint that is simple and easy to manufacture and also to mount in an automated way.

To this end the invention provides a functional hydro-elastic element of the above-mentioned type that is characterised by at least one row of hydraulic chambers, extending circumferentially and comprising at least three hydraulic chambers and at least one throttling duct that enables communication of liquid respectively between each pair of circumferentially adjacent hydraulic chambers so that a variation of at least one working volume of the hydraulic chambers caused by working-load vibrations can be balanced by enabling a flow of liquid into at least one of the other hydraulic chambers.

In an embodiment of the invention the joint and/or the functional hydro-elastic element can be realised completely symmetrical and/or can be mounted in any direction in its housing, for instance in a sleeve of a suspension arm, without a specific orientation of the longitudinal axis of the joint before the assembly and without a particular angular orientation in a plane perpendicular to the longitudinal axis. Thus, the productivity during the—if possible, automated—assembly of the joint to a car-to-ground connecting element is improved.

Besides, the joint of one embodiment can ensure hydraulic filtering along any of its radial axes in a plane that is perpendicular to the longitudinal axis. In the case of joints for car-to-ground connection this hydraulic filtering can be essentially equal in all the radial directions if assembly of the joint without a particular angular orientation is desired.

For example, the hydro-elastic joint and/or functional element with several elastomer layers, separated by one or several intermedial frames combines at the same time the possibility of assembling the joint in its receiving housing without specific angular orientation and in any direction along the axis of the receiving housing, hydraulic filtering being essentially radially constant for any radial excitation direction, a reduced ejection path for the hydraulic fluid, and finally the optional possibility, in one embodiment, to provide hydraulic filtering axially.

In one embodiment the external, intermedial and/or internal frame are stiffer than the elastic bodies of the elastic unit of the functional hydro-elastic element. For example, the external and/or internal frame can be made from metal.

For example, in one embodiment at least one of the rows of hydraulic chambers comprises more than three, four, five, six, seven, eight, twelve, 16 or 24 hydraulic chambers, in particular exactly four, five, six, seven, eight, twelve, sixteen or 24 hydraulic chambers.

According to one embodiment at least two hydraulic chambers can be necessary for at most every 90° of angular sector, that is at least 8 peripheral hydraulic chambers. In another embodiment 10 to 12 hydraulic chambers and/or partial chambers are arranged side by side in a circumferential row in the functional hydro-elastic element, for example in the case of two circumferential rows 20 to 24 hydraulic chambers and/or partial chambers, or even more if the perimeter of the joint allows.

In one embodiment the functional hydro-elastic element is limited to less than 48 hydraulic chambers, in particular less than 30 hydraulic chambers, which are in particular arranged in a circumferential row.

In one embodiment each hydraulic chamber of a row of hydraulic chambers has a circumferential width of less than or equal to about 45 degrees, for example less than about 30 degrees, in particular between 10 and 30 degrees.

In another embodiment the hydraulic chambers of the at least one row of hydraulic chambers cover at least 50%, in particular at least 70% of a circumferential surface of the functional hydroelastic element between its two axial ends.

For example, in one embodiment the hydraulic chambers have a mean radial extension between 2 and 10 mm, in particular between 3 and 5 mm.

The joint can be characterised in that the hydraulic chambers of the at least one row of hydraulic chambers have a mean radial extension between 10 and 60 percent of the maximum radial extension of the functional hydro-elastic element, in particular between 20 and 50 percent.

The smaller the hydraulic chambers are the easier the liquid contained in them can be ejected via an orifice or a calibrated opening, the ejection path being reduced, and the larger becomes the number of hydraulic chambers side by side, forming a peripheral layer of significant surface area without suffering from the inconveniences of solutions providing only one or two thin peripheral layers.

In another embodiment the hydraulic chambers of the at least one row of hydraulic chambers are essentially identical.

In one embodiment the hydraulic chambers are essentially rectangular from a radial side view, and have, in particular, an essentially identical radial extension and circumferential extension.

In another embodiment the functional hydro-elastic element can be characterised in that the hydraulic chambers are circumferentially delimited by axial walls extending in axial direction, and/or are delimited in axial direction by circumferential walls extending in circumferential direction, wherein the axial and/or circumferential walls are formed by the functional hydro-elastic element.

In one embodiment the axial walls have a circumferential width of between $1/20$ and $1/5$, in particular about a tenth, of the circumferential extension of a hydraulic chamber of a row of hydraulic chambers.

In one embodiment the relationship between the axial extension of the hydraulic chambers and the axial extension of the throttling ducts is at least 5, in particular at least 10, in order to achieve a throttling effect. For example, the relationship of the axial extension of the at least one hydraulic chamber towards the axial extension of the at least one throttling duct is at least 15.

In one embodiment the at least one throttling duct is permanently open under load vibrations.

For example, in one embodiment at least one throttling duct leads into at least one of the axial walls, in particular at at least one of the transitions between an axial wall and a circumferential wall.

In another embodiment the throttling ducts lead into the two axial walls of each hydraulic chamber of the same row of hydraulic chambers, in particular respectively at a transition between the respective axial wall and the same circumferential wall, or in each hydraulic chamber of the same row of hydraulic chambers a first throttling duct leads into the first axial wall at a transition between the first axial wall and a first circumferential wall and a second throttling duct leads into the second axial wall at a transition between the second axial wall and a second circumferential wall.

In one embodiment a system of throttling ducts is formed such that the throttling ducts hydraulically connect in series the hydraulic chambers of a row of hydraulic chambers.

In one embodiment a system of throttling ducts, comprising at least one throttling duct, is formed such that a liquid ejected from a hydraulic chamber can be introduced into any hydraulic chamber without passing via another intermediate chamber in particular of the same row of hydraulic chambers. Hydraulic filtering of a load in radial direction of the joint can thus be achieved.

In one embodiment, with respect to radial loads, complementary lateral orifices are provided for the expulsion of hydraulic liquid, and these orifices are disposed in an aligned manner either at least at an extremity of each hydraulic chamber, or at the middle of the chamber walls, or in an unaligned way, the orifices being disposed in a staggered pattern.

In another embodiment the functional hydro-elastic element comprises or consists of an elastic body.

For example, the joint can be characterised in that the functional hydro-elastic element comprises at least two rows of hydraulic chambers superimposed in axial direction, in particular a first row and a second row.

In one embodiment a throttling duct is formed between the two rows of hydraulic chambers and is separated from the hydraulic chambers of the first row by a first circumferential wall and/or from the hydraulic chambers of the second row by a second circumferential wall.

In another embodiment the hydraulic chambers of the first row and the second row are in liquid communication between each other in order to allow hydraulic filtering in direction of the longitudinal axis.

For example, in one embodiment the first circumferential walls and/or the second circumferential walls have at least one axial opening, wherein in particular the at least one axial opening in a first circumferential wall is facing the at least one axial opening in a second circumferential wall, axially adjacent to the first circumferential wall.

In one embodiment the hydraulic chambers of the first row and of the second row are symmetrical with respect to a plane orthogonal to the longitudinal axis and disposed between the first and the second row.

In another embodiment the axial openings have a circumferential width corresponding to the calibrated opening necessary for the hydraulic filtering along the longitudinal axis.

For example, in one embodiment the openings themselves are bordered by small opening wall sections, aligned with the axial direction. For example, the opening wall sections can be formed in the elastic body of the functional hydro-elastic element.

In another embodiment each hydraulic chamber has a radial profile having a circumferential reference plane defined by a peripheral cylindrical surface of the functional hydro-elastic element, wherein the radial profile comprises an abutment area having a first depth with respect to the reference plane and at least one cavity, in particular in the shape of a groove, between the abutment area and at least one of the axial and/or circumferential walls of the hydraulic chamber, wherein the cavity has a greater depth than the abutment area.

In one embodiment each hydraulic chamber comprises an abutment area forming a radial abutment and/or a drainage piston. For example, within each hydraulic chamber or each partial chamber a radial abutment made of elastomer is disposed in order to force and facilitate the flow of the liquid contained in said chambers.

In another embodiment the abutment area is bordered at each side by a cavity.

In one embodiment a part of one of at least one cavity or groove extends circumferentially, extending from the throttling ducts. In one embodiment the part of the cavity or groove extending from the lateral openings is disposed along the edges or circumferential walls that respectively delimit the area covered by the chambers.

For example, in one embodiment the abutment area is bordered at each side by a radial cavity.

Furthermore, a cavity, groove or neck is arranged at at least one of the sides of each chamber to increase the volume of the hydraulic liquid, facilitate its expulsion, and increase the effect of the bottom piston or of the abutment area of each chamber.

In another embodiment the abutment area and/or the at least one radial cavity is/are arranged in the elastic body and/or the functional hydro-elastic element.

In one embodiment the functional hydro-elastic element is characterised by at least two groups of rows of hydraulic chambers, wherein each group of rows of hydraulic chambers comprises at least one row of hydraulic chambers, and by a system of throttling ducts formed such that the hydraulic chambers of a first group of rows of hydraulic chambers are hydraulically separated from the hydraulic chambers of a second group of rows of hydraulic chambers.

For example, in one embodiment the volume of each hydraulic chamber of a first row of hydraulic chambers, in particular of the first group of rows of hydraulic chambers, is larger than the volume of the respective hydraulic chambers of a second row of hydraulic chambers, in particular of the second group of rows of hydraulic chambers.

For example, the volume of each hydraulic chamber of a first row of hydraulic chambers is at least 1.5 times larger, in particular at least two times larger than the volume of the respective hydraulic chambers of a second row of hydraulic chambers.

In one embodiment the transverse cross-sectional area, in particular in radial direction in the axial walls, of the throttling ducts of a first row of hydraulic chambers, in particular of the first group of rows of hydraulic chambers, is larger than the transverse cross-sectional area, in particular in radial direction in the axial walls, of the throttling ducts of a second row of hydraulic chambers, in particular of the second group of rows of hydraulic chambers. Typically, a transverse cross-section is orthogonal to the direction of flow of a liquid in the throttling duct.

For example, the cross-sectional area in radial direction of the throttling ducts of a first row of hydraulic chambers is at least two times larger, in particular at least three times larger than the cross-sectional area of the throttling ducts of a second row of hydraulic chambers.

For example, the axial dimension of the throttling ducts in the axial walls of a first row of hydraulic chambers is larger than the axial dimension of the throttling ducts in the axial walls of a second row of hydraulic chambers.

For example, in one embodiment the damping frequency for the load vibrations in radial direction of a first row of hydraulic chambers, in particular of the first group of rows of hydraulic chambers is lower than the damping frequency for the load vibrations in radial direction of a second row of hydraulic chambers, in particular of the second group of rows of hydraulic chambers.

Additionally, the invention provides a hydro-elastic joint for assembling two structural parts, in particular to connect a wheel suspension to a vehicle body, comprising a longitudinal axis, a rigid external frame, a rigid internal frame, and a functional hydro-elastic element linking the internal frame to the external frame in a vibration-damping manner according to one of the embodiments described in the present disclosure.

In one embodiment the hydraulic chambers are delimited by one of the internal, intermedial and external frame, and the functional hydro-elastic element.

In one embodiment where the hydraulic chambers are limited by the external or internal frame, the joint is simple and easy to manufacture and the chambers and hydraulic ducts can be disposed at the periphery of the elastomeric body of the hydro-elastic spring unit, just below the external frame, without employment of an additional plastic clip to keep the price low, and without difficulty for the introduction of the hydraulic liquid in order to avoid the presence of air bubbles in the fluid.

In one embodiment at least one of the frames, in particular all of the frames is or are a sleeve, in particular a cylindrical sleeve.

In one embodiment the internal, external and intermedial frames are essentially concentric in a relaxed state of the joint.

In one embodiment the multi-layer joints feature at least 3 concentric frames that thus delimit two or more annular areas of elastomer. These joints can be very stiff radially (commonly between 8000 and 30000 N/mm), but relatively flexible in torsional direction about their longitudinal axis Z.

The following description allows to add a certain number of further details and variants to the principal characteristics explained above, and to present some examples of devices corresponding to the present invention.

BRIEF DESCRIPTION OF THE DRAWINGS

FIG. 8 is a perspective view of a joint according to another embodiment;

FIG. 9 is a partial side view, taken radially, of the embodiment of FIG. 8;

DETAILED DESCRIPTION

Figure 1:
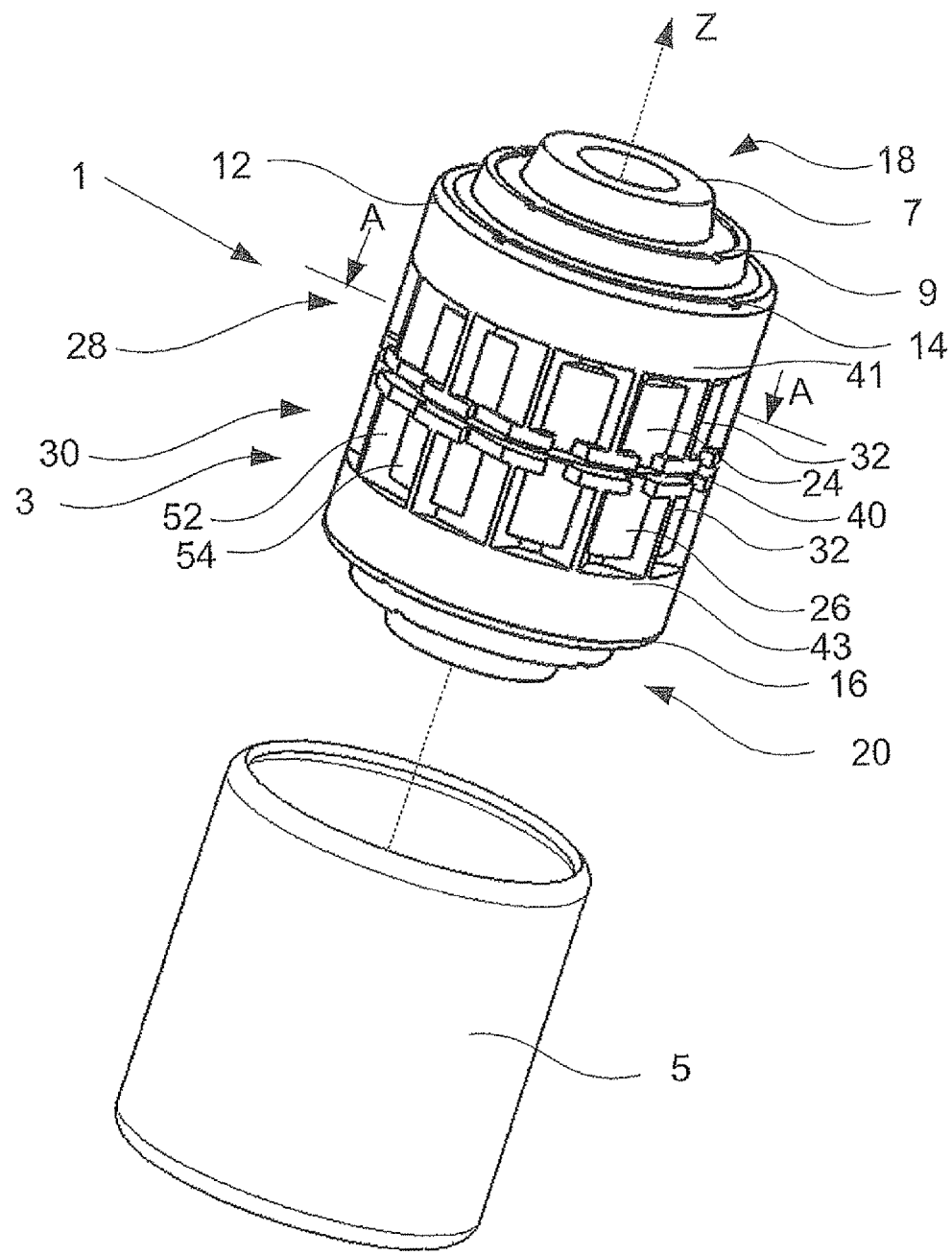
FIG. 1 is a perspective view of a joint according to an embodiment just before the body of the joint is inserted into its outer sleeve.

FIG. 1 is a perspective view of a joint 1 according to an embodiment of the present invention. The joint comprises a hydro-elastic spring or a functional hydro-elastic element 3 and a cylindrical external frame 5. The figure shows the joint just before the functional hydro-elastic element 3 is slipped into the cylindrical external frame 5. The hydro-elastic spring 3 has an internal frame 7 and an intermedial frame 9. The internal, intermedial and external frames have the shape of a sleeve or of a socket and are all three essentially cylindrical and coaxial with respect to a longitudinal axis Z. The sleeves or external 5 and internal 7 frames are designed to be fixed respectively at two parts of a structure (not represented) in order to assemble these parts and damp the transmission of vibrations between them. For example, one of these two parts can be fixed in a bore formed in the internal frame. The bore is essentially coaxial with the longitudinal axis Z. The external or internal frame can, for example, be fixed to a suspension arm of a car-to-ground connection of a vehicle.

In the description, "upper" and "lower" are defined with respect to the axis Z that represents a direction. Nonetheless, the joint can be essentially symmetrical with respect to a plane orthogonal to the longitudinal axis.

The functional hydro-elastic element 3 is disposed between the external 5 and the internal 7 sleeve. The functional hydro-elastic element 3 comprises an elastic body 12. The elastic body 12 comprises an intermedial frame 9. In one embodiment the elastic body 12 can comprise several intermedial frames 9 in order to adjust the torsional stiffness and the axial stiffness of such joints. The elastic body 12 can be an elastomeric or rubber body. The elastic body 12 extends axially between two ends, each of which has a circular rim 14, 16, in particular an upper rim 14 and a lower rim 16. Additionally, at each of its ends in axial direction the joint has fitting areas 18, 20.

FIG. 1 shows hydraulic chambers 24, 26, disposed in two circumferential rows 28 and 30 superimposed in axial direction, in particular one upper circumferential row 28 and a lower circumferential row 30. The upper row comprises upper hydraulic chambers 24 and the lower row comprises lower hydraulic chambers 26. The circumferential upper and lower rows 28, 30 have an essentially identical design and are symmetrical with respect to a plane between the two rows, the plane being orthogonal to the longitudinal axis Z. This plane can correspond to a plane of symmetry of the joint. The hydraulic chambers 24, 26 of the two circumferential rows 28, 30 form a mesh and, in one embodiment, together cover 70% of the periphery of the joint between the two axial ends of the elastic body 12 and/or between the circular upper rim 14 and the circular lower rim 16. The circumferential rows 28, 30 of hydraulic chambers 24, 26 are disposed annularly in the elastic body 12 in the form of a ring that is concentric with the internal 7, external 5 and intermedial 9 frame in a relaxed state of the joint 1. Typically, the hydraulic chambers are arranged in the elastic body 12.

The hydraulic chambers 24, 26 of each circumferential row 28, 30 are disposed circumferentially and adjacent to each other. Two consecutive hydraulic chambers 24, 26 on the circumference of a same circumferential row are separated by an axial wall 32. In one embodiment the axial wall 32 can be perforated by lateral or circumferential holes 38, thereby forming throttling ducts 40. The hydraulic chambers of the upper circumferential row of hydraulic chambers are limited in the axial direction by upper circumferential walls 41 and lower circumferential walls 42. The hydraulic chambers of the lower circumferential row of hydraulic chambers are limited in the axial direction by upper circumferential walls 44 and lower circumferential walls 43.

Figure 2:
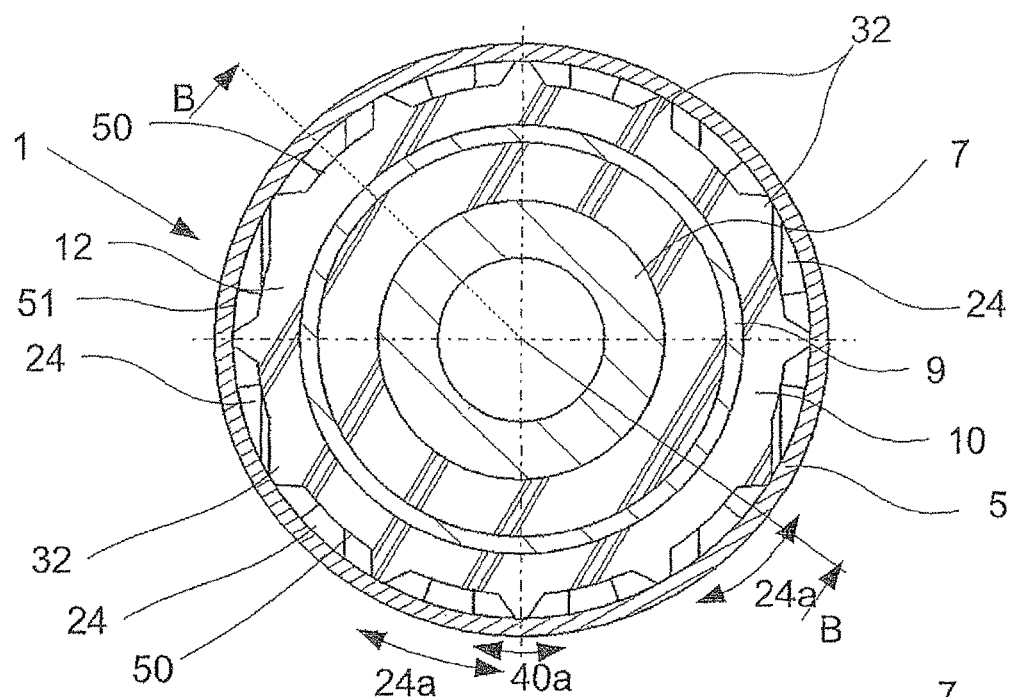
FIG. 2 is a cross-sectional view of FIG. 1 according to AA, the body of the joint being inserted in its outer sleeve.

Each hydraulic chamber 24, 26 has a height in axial direction $24h$, $26h$ and a circumferential width $24a$, $26a$. The angular or circumferential width of a hydraulic chamber of an upper or lower circumferential row 24, 26 corresponding to the circumferential, curvilinear width $24a$, $26a$ is less or equal to 45°. In an other embodiment the angular width is about 10° to 30°. In this case it is possible to multiply the number of hydraulic chambers. In the case of FIGS. 1 and 2 the joint comprises 24 chambers divided into two circumferential rows 28, 30 of 12 hydraulic chambers 24, 26 each, superimposed according to the longitudinal axis Z.

FIGS. 1 to 4 show a circumferential channel or a throttling duct 40 that is disposed between the two circumferential rows 28 and 30 of hydraulic chambers 24, 26 for the circumferential flow of a hydraulic liquid. Segments of the circumferential throttling duct 40 and the adjacent hydraulic chambers 24 of the upper row 28 are respectively separated by the lower circumferential wall 42, and the segments of the circumferential channel 40 and the adjacent hydraulic chambers 26 of the lower circumferential row 30 are separated by the upper circumferential wall 44 of the respective hydraulic chambers 26. Consequently, the circumferential throttling duct 40 passes via the intermediate circumferential openings 38 in the axial walls 32 and between the circumferential walls 42, 44. The relationship between an axial dimension 38h of the intermediate circumferential openings 38 and an axial dimension 24h, 26h of the hydraulic chambers 24, 26 is between 1/10 and 1/30, for example between 1/15 and 1/25. Thus, the axial dimension 38h of the intermediate circumferential openings or a width in axial direction of the circumferential throttling duct 40 corresponds to the calibrated orifice necessary for the hydraulic filtering in circumferential direction. The circumferential throttling duct 40 typically has a radial extension 40r that is larger than the radial extension of a hydraulic chamber 24r, 26r.

An axial opening 46, 48 is formed in the middle of the upper circumferential wall 44 of the chambers 26 of the lower circumferential row of hydraulic chambers 30, and in the middle of the lower circumferential wall 42 of the chambers 24 of the upper circumferential row of hydraulic chambers 28, which walls respectively separate a hydraulic chamber 24, 26 from the circumferential throttling duct 40, wherein the axial opening 46, 48 has a circumferential width 46a, 48a.

Between the axial openings 46, 48 of two circumferentially adjacent hydraulic chambers the respective section of the circumferential throttling duct has a length 40a in circumferential direction. Furthermore, the axial openings 46, 48 of axially adjacent hydraulic chambers 24, 26 are facing each other. The circumferential width 46a, 48a corresponds to the calibrated orifice necessary for the hydraulic filtering along the longitudinal axis Z between two superimposed or axially adjacent hydraulic chambers 24, 26. For example, in one embodiment the width 46a, 48a can be 1/10 to 1/3 of the circumferential length of the upper or lower wall 42, 44 of the respective hydraulic chamber.

The hydraulic chambers 24, 26 are delimited in axial direction by the upper or lower circumferential walls 41, 42, 43, 44, and circumferentially by the axial walls 32. The external frame 5 closes the periphery of the hydraulic chambers 24, 26 and keeps the hydraulic liquid in the hydraulic chambers. Hence the hydraulic chambers 24, 26 are delimited in radial direction by the external frame 5 and a bottom 50 formed by the elastic body 12. Thus, the joint has hydraulic chambers 24, 26 under its periphery, just underneath the external frame. In one embodiment the bottom 50 has a depth in radial direction between 3 and 5 mm with respect to the radial end of a part of the elastic body 12 between the circumferential rows 28, 30 of hydraulic chambers and the upper and lower circular rims 14, 16, or to the internal surface of the external frame 5.

Each hydraulic chamber has a radial profile. The radial profile has a circumferential reference plane 51 defined by a peripheral cylindrical surface of the functional hydro-elastic element 3. The radial end portion of the elastic body 12 between the circumferential rows 28, 30 and the upper and lower circular rims 14, 16 can be in this reference plane. The reference plane 51 can correspond to the internal surface of the external frame. The bottom 50 of each hydraulic chamber 24, 26, in particular with respect to the external frame 5, comprises at least at one of its four sides a border area or a cavity 52 that is deeper with respect to a central part or an abutment area 54 of the bottom 50 of the respective hydraulic chamber 24, 26. Thus, the cavity 52 has a greater depth than the abutment area 54 with respect to the reference plane. In one embodiment this cavity is disposed at four sides of the hydraulic chamber 24, 26 in the case of an essentially rectangular chamber. In another embodiment each hydraulic chamber comprises a cavity in form of a circumferential groove at one of its axial ends, in particular at the axial end of the hydraulic chamber 24, 26.

FIG. 2 is a cross-sectional view of FIG. 1 according to AA, wherein this line symbolises the trace left by a plane perpendicular to Z passing through the middle of the row 28 of hydraulic chambers 24. This sectional view is directed towards the middle of the articulation 1, which enables to show in the background the circumferential length 40a of the sections of the circumferential throttling duct 40 between two axial openings as well as the circumferential width 46a, 48a of the axial openings in the lower and upper walls 46, 48 or the distance between two sections of the circumferential throttling duct 40 in circumferential succession. In FIG. 2 the circumferential width 24a, 26a of a hydraulic chamber 24, 26 can also be found.

FIG. 2 shows 12 hydraulic chambers side by side, separated from each other by the respective axial wall 32 of elastomer. The 12 hydraulic chambers 24 form the upper circumferential row 28 of hydraulic chambers 24 of FIG. 1. In another embodiment the joint can also have a different number of hydraulic chambers. For example, in one embodiment the joint can have at least eight hydraulic chambers of essentially identical shape in one circumferential row.

Figure 3:
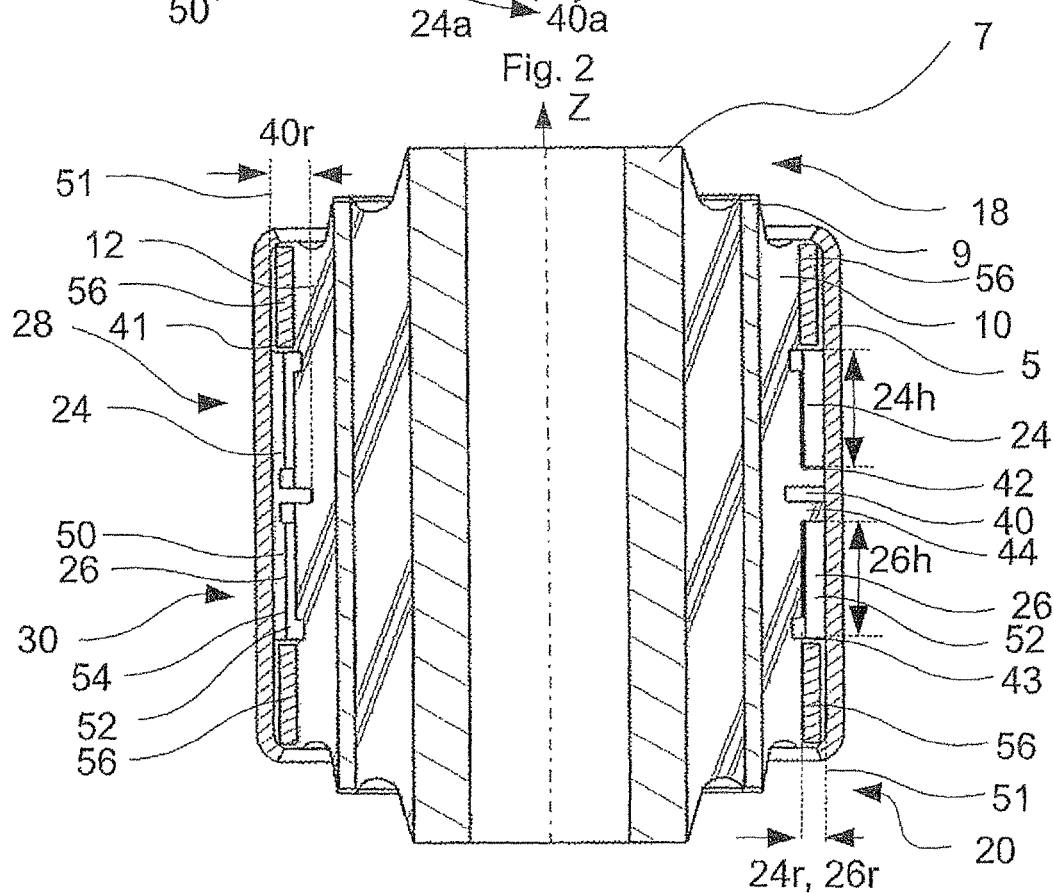
FIG. 3 is a partial view of the joint in longitudinal cross-section according to BB of FIG. 2.
Figure 4:
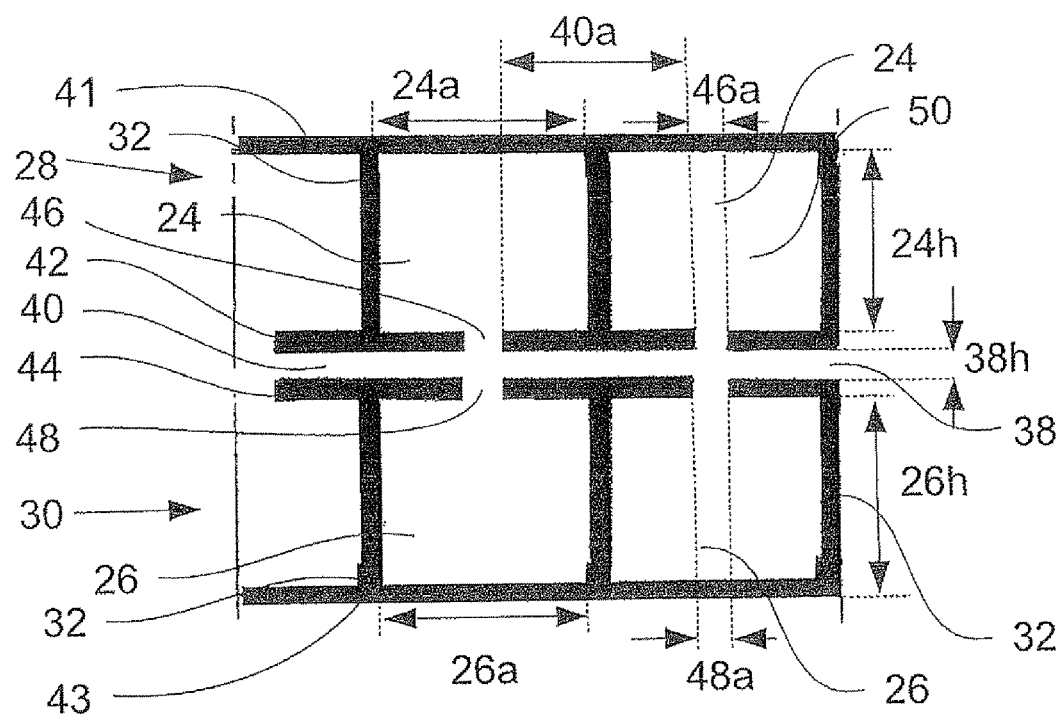
FIG. 4 is a partial side view, taken radially, of the embodiment of FIG. 1.

FIG. 3 is a longitudinal sectional view according to BB of FIG. 2, and FIG. 4 is a partial side view, taken radially, of an embodiment of the joint without its external frame 5.

On the right hand side of FIG. 3 the section line crosses the circumferential throttling duct 40 for peripheral communication between the hydraulic chambers while on the left hand side of that figure the section line passes the axial communication openings 46, 48 in the respective upper and lower circumferential walls 42, 44 (visible in FIGS. 2 and 4) between two superimposed or axially adjacent hydraulic chambers, wherein the openings have a width 46a, 48a. The axial openings result, in one embodiment, in a continuous bottom surface 50 for two superimposed hydraulic chambers 24, 26. Each section of the circumferential throttling duct 40 is delimited and surrounded by the parallel upper circumferential walls 44 of the chambers of a lower circumferential row and the lower circumferential walls 42 of the chambers of an upper circumferential row, which walls create between them a space corresponding to the calibrated orifice necessary for the radial hydraulic filtering (peripheral flow).

In FIG. 4 it can also be seen that each chamber is bordered at at least one side, in particular at all sides, by a cavity 52 that is deeper compared to the abutment area 54 and located between this abutment area 54 and the axial walls 32 of the hydraulic chamber 26. The upper and lower walls 42 and 44 that define the sections of the circumferential throttling duct 40 for circumferential communication of the hydraulic liquid have such a length that the distance between two consecutive sections of the circumferential throttling duct leave a clearance 46*a*, 48*a* which corresponds to the necessary calibration of the orifice allowing the hydraulic liquid to pass in direction of the longitudinal axis Z.

In one embodiment, owing to its outer surface in radial direction, the abutment area 54 of each hydraulic chamber serves as an abutment during a significant transverse or radial deformation of the joint. Furthermore, the abutment area serves as a small piston to facilitate the ejection of hydraulic liquid via the circumferential throttling ducts 40, which would be difficult to do with a thin hydraulic chamber of large dimension.

Collars or pieces of external frame 56 are embedded in the periphery of the elastic body 12 between the rows 28, 30 of upper and lower hydraulic chambers 24, 26 and the respective rims 14, 16 of the elastic body 12 of the hydro-elastic spring. Thus, a part of the periphery of the elastic body 12 that delimits the hydraulic chambers 24, 26 is disposed between these collars 56 or pieces of external frame 5. The collars 56 have a cylindrical shape concentric with respect to the external frame or sleeve and are located at two ends of the joint just before the conical end sections. The collars 56 can reinforce the radial strength of the joints. The collars are respectively aligned with the edge of the circular rims 14 and 16. In another embodiment the collars 56 can be arranged such that they abut against the external frame. In FIG. 3 they are shown as embedded in the elastic or rubber body 12, and thus there is a fine layer of rubber or elastomer between the external surface of these collars 56 and the bore or internal surface of the external frame 5.

Figure 5:
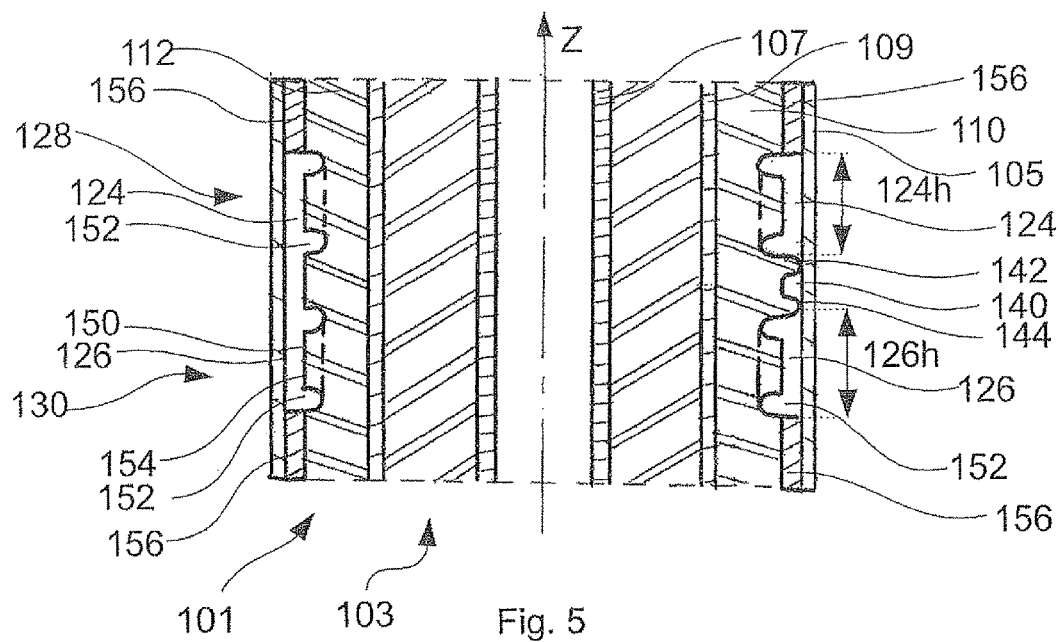
FIG. 5 is a partial view of another embodiment of the joint in longitudinal cross-section according to BB of FIG. 2.

FIG. 5 is a longitudinal sectional view according to BB of FIG. 2 of another embodiment. The same reference numerals denominate the same elements of the joint with an addition of 100. The fitting areas, for example those of FIG. 1, are not represented in this longitudinal cut, which is limited to the cylindrical part of the joint between the upper and lower rims. Here the cavity 152, which is deeper than the abutment area, lines the four sides of the periphery of each hydraulic chamber 124, 126. This variant enables to reinforce the piston effect of the bottom 150 of each hydraulic chamber 124, 126 and increases the possible hydraulic debit.

Figure 6:
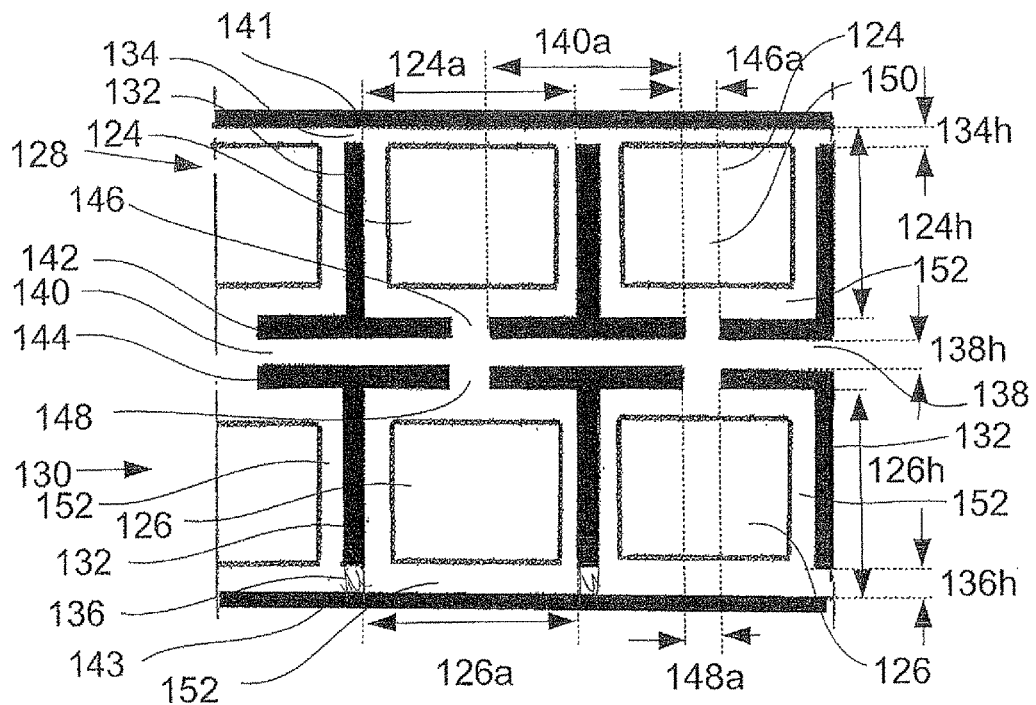
FIG. 6 is a partial side view, taken radially, of the embodiment of FIG. 5.

FIG. 6 is a partial side view, taken radially, of one embodiment of a joint without its external frame 105. The axial walls 132 do not completely close each hydraulic chamber in circumferential direction. The axial walls 132 have orifices 134, 136, in particular at a transition between the axial walls 132 and the upper circumferential walls 141 in the hydraulic chambers 124 of the upper circumferential row 128 and at a transition between the axial walls 132 and the lower circumferential walls 143 in the hydraulic chambers 126 of the lower circumferential row 130. The upper and lower lateral orifices or openings 134, 136, that form throttling ducts, increase the possibilities of peripheral hydraulic debit during a radial excitation. A relationship between an axial dimension 134*h*, 136*h* of the upper and lower lateral openings 134, 136 and an axial dimension 124*h*, 126*h* of the hydraulic chambers 124, 126 is between ⅕ and ¹/₂₅, for example between ¹/₁₀ and ¹/₂₀. Thus, the axial dimension 134*h*, 136*h* of the intermediate, upper and lower openings corresponds to the calibrated orifice necessary for the hydraulic filtering in circumferential direction. The cavities 152 located beside the upper circumferential wall 141 of the hydraulic chambers 124 of the upper circumferential row 128 or located beside the lower circumferential wall 143 of the hydraulic chambers 126 of the lower circumferential row 130 of hydraulic chambers can be continuous, passing from one hydraulic chamber to another circumferentially adjacent hydraulic chamber. Thus, these cavities 152 at the lower end of the hydraulic chambers of the lower row and at the upper end of the hydraulic chambers of the upper row respectively form a circumferential channel that is supplementary to the circumferential throttling duct 140.

In one embodiment each hydraulic chamber 124, 126 of width 124*a*, 126*a* and height 124*h*, 126*h* comprises an abutment area 154 surrounded at its four sides by a cavity 152 that is somewhat deeper than the central part 154 with respect to the reference plane.

Figure 7:
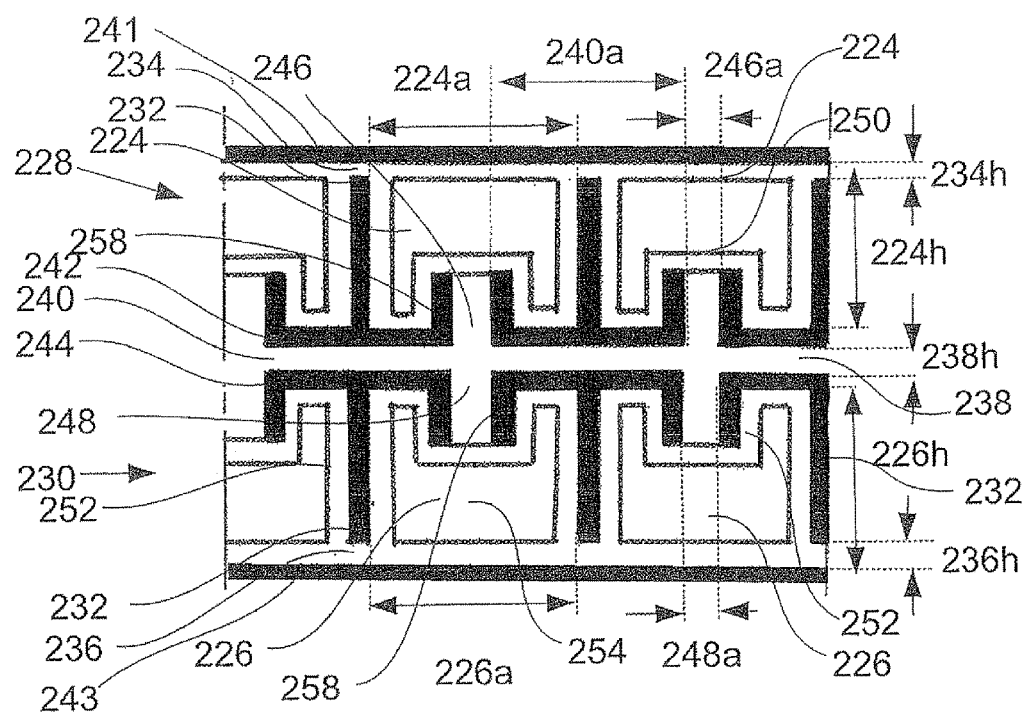
FIG. 7 is a partial side view, taken radially, of another embodiment of a joint.

FIG. 7 is a partial side view, taken radially, of another embodiment of a joint without its external frame. The embodiment of FIG. 7 is a variant of the embodiment of the FIGS. 5 and 6. The same reference numerals denominate the same elements of the joint as in the embodiments of FIG. 1 with an addition of 200. In the embodiment of FIG. 7 the axial openings 246, 248, which form throttling ducts of the hydraulic chambers 224, 226 towards the circumferential throttling duct 240 that is in direction of the longitudinal axis Z, have at each side an opening wall 258 extending from the circumferential throttling duct 240 towards the centre of the respective hydraulic chambers. The opening walls 258 have a length in axial direction between a quarter and a third of the axial extension of a hydraulic chamber 224, 226. The openings are designed to let the hydraulic fluid pass during an excitation along the Z-axis.

In the figures, the axial walls 232, the opening walls 258, and the upper and lower circumferential walls 241, 242, 243 and 244 are drawn as thick lines in order to distinguish them from the cavities 252 that are arranged peripherally to each hydraulic chamber.

FIG. 8 shows another embodiment of a joint 301 in a perspective view without the external frame, and FIG. 9 shows a partial side view of the joint 301, taken radially. The same reference numerals denominate the same elements of the joint as in the embodiments of FIG. 1 with an addition of 300. The joint 301 comprises a single circumferential row of hydraulic chambers 322, and lateral openings 334, 336 for the communication between hydraulic chambers 322, forming throttling ducts, are disposed in the axial walls 332. The lateral or circumferential openings 334, 336 are arranged in a zigzag pattern. Upper and lower are defined with respect to the axial direction Z. The openings 334, 336 in the consecutive axial walls 332 are formed alternatingly at a transition between the axial wall 332 and the lower circumferential wall 343 and at a transition between the axial wall 332 and the upper circumferential wall 341. Thus, once an opening 334 and once a closed piece of wall 332 is found at the upper side of the axial wall 332 of a hydraulic chamber. At the lower side along axial direction Z an alternation of openings 336 and of closed pieces of wall 332 is found. During a radial excitation the fluid must transit circumferentially and must perform zigzags through the openings 334 and 336.

Figure 10:
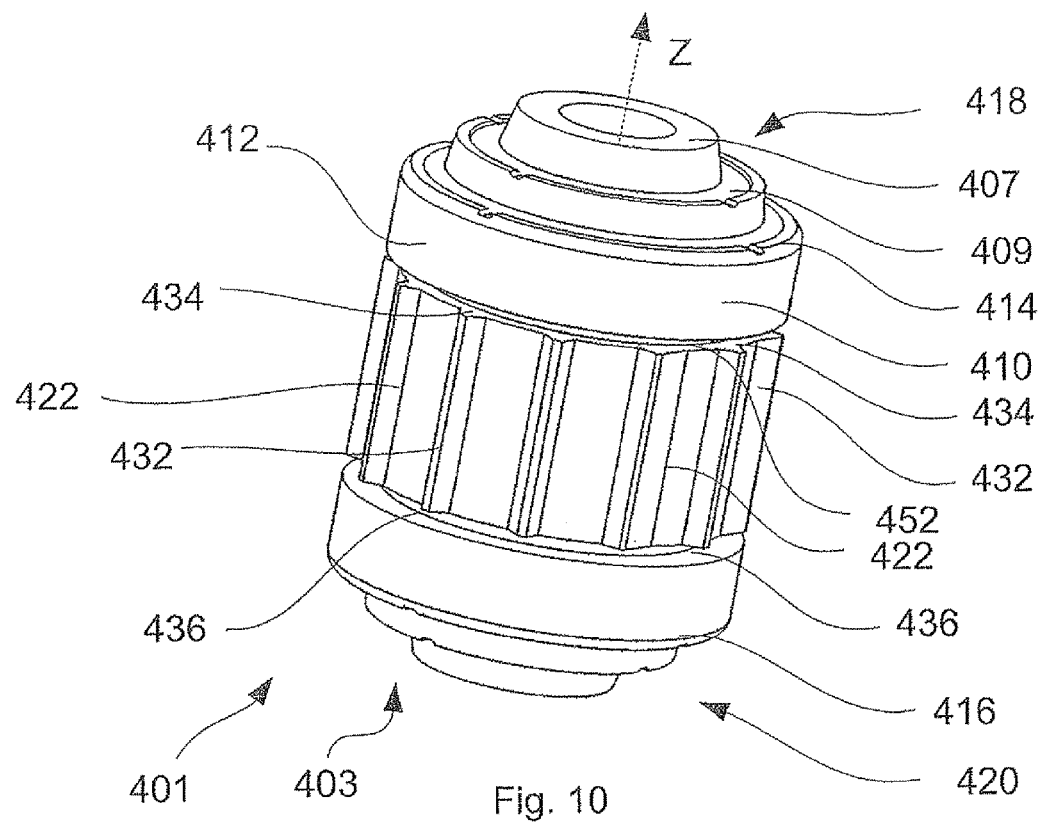
FIG. 10 is a perspective view of a joint according to another embodiment.
Figure 11:
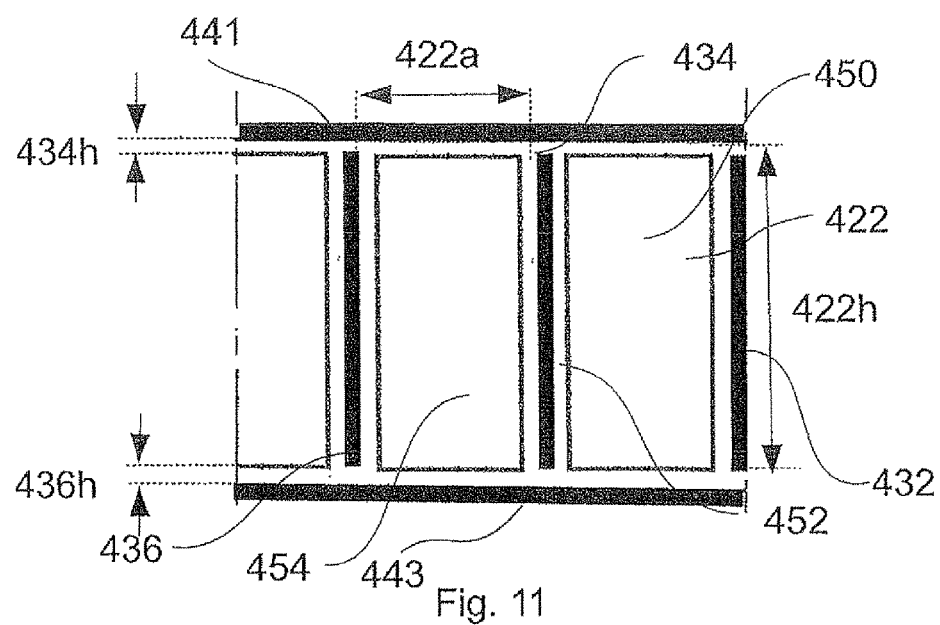
FIG. 11 is a partial side view, taken radially, of the embodiment of FIG. 10.

FIG. 10 shows a perspective view of another embodiment of a joint 401 without the external frame, and FIG. 11 shows a partial side view, taken radially, of the joint 401. The same reference numerals denominate the same elements of the joint as in the embodiments of FIG. 1 with an addition of 400. The joint 401 comprises a single circumferential row of hydraulic chambers 422, but the openings 434, 436 for communication between the hydraulic chambers form throttling ducts at two ends of the chambers or at two transitions between the axial wall 432 and the upper and lower circumferential walls 441, 443. Each wall between two hydraulic chambers has a small opening at its two axial ends. The embodiment of the FIGS. 10 and 11 is a variant of the embodiment of FIGS. 8 and 9 but with a different arrangement of the throttling ducts for circulation of the hydraulic fluid.

Figure 12:
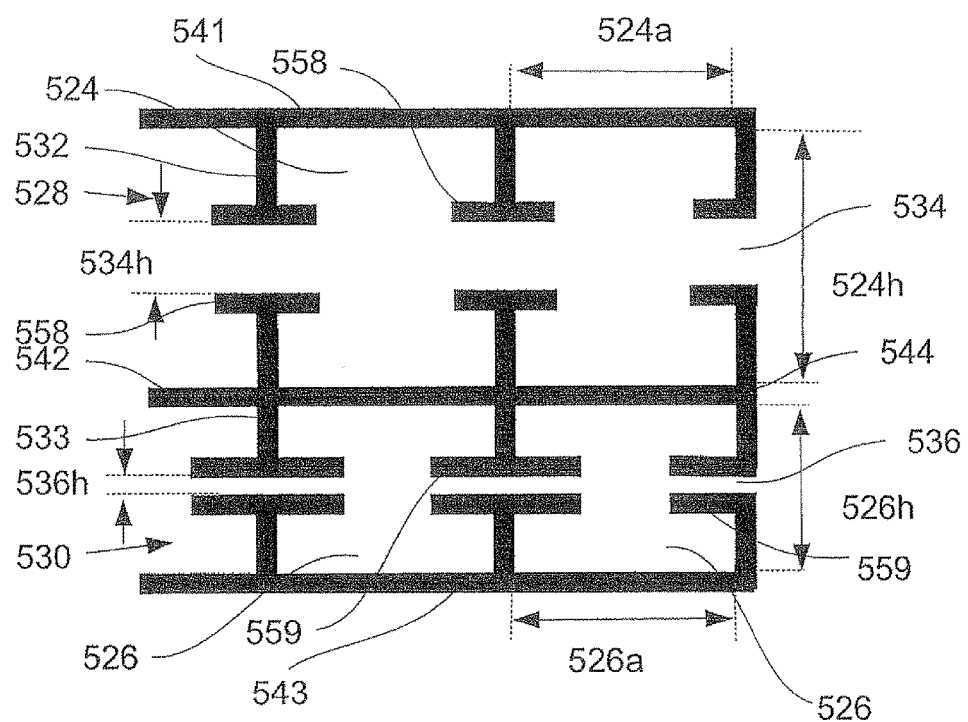
FIG. 12 is a partial side view, taken radially, of another embodiment.

FIG. 12 is a partial side view, taken radially, of another embodiment of a joint without its external frame. The embodiment of FIG. 12 is a variant of the embodiment of FIGS. 5 and 6. The same reference numerals denominate the same elements of the joint as in the embodiments of FIG. 1 with an addition of 500. The embodiment of FIG. 12 comprises two rows of hydraulic chambers or circumferential rows, in particular a first row 528 of hydraulic chambers 524 and a second row 530 of hydraulic chambers 526 that extend in circumferential direction. In one embodiment the volume of each hydraulic chambers 524 of the first row 528 of hydraulic chambers is different from the volume of the respective hydraulic chambers 526 of the second row 530 of hydraulic chambers. For example, in a radial side view the surface of the hydraulic chambers 524 of the first row 528 of hydraulic chambers is larger than the surface of the hydraulic chambers 526 of the second row 530 of hydraulic chambers. In one embodiment the respective circumferential extension 524a, 526a of the hydraulic chambers 524, 526 of the first row 528 of hydraulic chambers and of the second row 530 of hydraulic chambers is essentially equal, but the axial extension 524h of the hydraulic chambers 524 of the first row 528 is larger than the axial extension 526h of the hydraulic chambers 526 of the second row 530. In the embodiment of FIG. 12 the number of hydraulic chambers of the first row 528 corresponds to the number of hydraulic chambers of the second row 530. The hydraulic chambers of the upper circumferential row or first row 528 of hydraulic chambers are respectively limited in axial direction by upper circumferential walls 541 and by lower circumferential walls 542 in direction of the second row 530 of hydraulic chambers. The hydraulic chambers of the lower circumferential row or second row 530 of hydraulic chambers are respectively limited in axial direction by upper circumferential walls 544 in direction of the first row 528 of hydraulic chambers and by lower circumferential walls 543. Two hydraulic chambers 524, 526, consecutive along the circumference of a same circumferential row, are respectively separated by an axial wall 532, 533.

The axial walls 532, 533 have orifices 534, 536, in particular in the middle in axial direction of the axial walls. The orifices or lateral openings 534, 536 of the first row 528 and of the second row 530 form throttling ducts and respectively have an axial dimension 534h, 536h. The axial dimension 534h of the throttling ducts 534 of the first row 528 corresponds to the calibrated orifice necessary for the hydraulic filtering in circumferential direction of a first range of frequencies of a load vibration in radial direction, and the axial dimension 536h of the throttling ducts 536 of the second row 530 corresponds to the calibrated orifice necessary for the hydraulic filtering in circumferential direction of a second range of frequencies of a load vibration in radial direction. Additionally, the hydraulic chambers 524 of the first row of hydraulic chambers and the hydraulic chambers 526 of the second row of hydraulic chambers are axially without hydraulic connection between each other. Thus, in the embodiment of FIG. 12 a system of throttling ducts 534, 536 is formed such that the hydraulic chambers 524 of the first row 528 of hydraulic chambers are hydraulically separated from the hydraulic chambers 526 of the second row 530 of hydraulic chambers.

For example, in one embodiment the first frequency range can damp vibrations perceptible from a hybrid vehicle driving with a combustion engine, and the second frequency range can damp vibrations perceptible from a hybrid vehicle driving with an electric motor. For example, one of the frequency ranges can be from 500 to 1000 Hz while the other frequency range is from 50 to 500 Hz. The frequency ranges can intersect with each other. Thus, with a joint according to the embodiment of FIG. 12 it is possible to generate two troughs of stiffness that enable a double radial filtering at two different frequencies.

In the embodiment of FIG. 12 the lateral openings 534, 536 form throttling ducts, having at each side an opening wall 558, 559 extending circumferentially from the axial wall 532, 533 towards the centre of the hydraulic chamber. The opening walls 558 of the lateral openings 534 of the first row 528 of hydraulic chambers have a smaller circumferential extension than the opening walls 559 of the lateral openings 536 of the second row of hydraulic chambers.

In another embodiment at least two arrangements of hydraulic chambers shown in the embodiments of the figures can be axially superimposed. Thus, the joint can comprise at least four superimposed rows of hydraulic chambers.

LIST OF REFERENCE NUMERALS

1 joint
3 functional hydro-elastic element
5 external frame
7 internal frame
9 intermedial frame
10 elastic body
12 elastic body
14 upper rim
16 lower rim
18 fitting areas
20 fitting areas
24 upper hydraulic chamber
24a circumferential width of a hydraulic chamber
24h height of a hydraulic chamber in axial direction
24r radial extension of a hydraulic chamber
26 lower hydraulic chamber
26a circumferential width of a hydraulic chamber
26h height of a hydraulic chamber in axial direction
26r radial extension of a hydraulic chamber
28 upper circumferential row
30 lower circumferential row
32 axial wall
38 circumferential hole
38 axial dimension of circumferential hole
40 circumferential throttling duct
40a circumferential length of a segment
40r radial extension of the circumferential throttling duct
41 upper circumferential walls
42 lower circumferential walls
43 lower circumferential walls
44 upper circumferential walls
46 axial opening
46a circumferential width of the axial opening
48 axial opening
48a circumferential width of the axial opening
50 bottom
52 cavity
54 abutment area
56 collars
101 joint
103 functional hydro-elastic element
105 external frame
107 internal frame
109 intermedial frame 110 elastic body
112 elastic body
124 upper hydraulic chamber
124a circumferential width of a hydraulic chamber
124h height of a hydraulic chamber in axial direction
126 lower hydraulic chamber
126a circumferential width of a hydraulic chamber
126h height of a hydraulic chamber in axial direction
128 upper circumferential row
130 lower circumferential row
132 axial wall
134 circumferential hole
134h axial dimension of circumferential hole
136 circumferential hole
136h axial dimension of circumferential hole
138 circumferential hole
138h axial dimension of circumferential hole
140 circumferential throttling duct
140a circumferential length of a segment
141 upper circumferential walls
142 lower circumferential walls
143 lower circumferential walls
144 upper circumferential walls
146 axial opening
146a circumferential width of the axial opening
148 axial opening
148a circumferential width of the axial opening
150 bottom
152 cavity
154 abutment area
156 collars
224 upper hydraulic chamber
224a circumferential width of a hydraulic chamber
224h height of a hydraulic chamber in axial direction
226 lower hydraulic chamber
226a circumferential width of a hydraulic chamber
226h height of a hydraulic chamber in axial direction
228 upper circumferential row
230 lower circumferential row
232 axial wall
234 circumferential hole
234h axial dimension of circumferential hole
236 circumferential hole
236h axial dimension of circumferential hole
238 circumferential hole
238 axial dimension of circumferential hole
240 circumferential throttling duct
240a circumferential length of a segment
241 upper circumferential walls
243 lower circumferential walls
244 upper circumferential walls
246 axial opening
246a circumferential width of the axial opening
248 axial opening
248a circumferential width of the axial opening
250 bottom
252 cavity
254 abutment area
258 opening wall
301 joint
303 functional hydro-elastic element
307 internal frame
309 intermedial frame
312 elastic body
314 upper rim
316 lower rim
318 fitting areas
320 fitting areas
322 hydraulic chambers
322a circumferential width of a hydraulic chamber
322h height of a hydraulic chamber in axial direction
332 axial wall
334 circumferential hole
334h axial dimension of circumferential hole
336 circumferential hole
336h axial dimension of circumferential hole
341 upper circumferential walls
343 lower circumferential walls
350 bottom
352 cavity
354 abutment area
401 joint
403 functional hydro-elastic element
407 internal frame
409 intermedial frame
412 elastic body
414 upper rim
416 lower rim
418 fitting areas
420 fitting areas
422 hydraulic chambers
422a circumferential width of a hydraulic chamber
422h height of a hydraulic chamber in axial direction
432 axial wall
434 circumferential hole
434 axial dimension of circumferential hole
436 axial dimension of circumferential hole
436 axial dimension of circumferential hole
441 upper circumferential walls
443 lower circumferential walls
450 bottom
452 cavity
454 abutment area
Z longitudinal axis

The invention claimed is:

1. A functional hydro-elastic element to be lodged in a hydro-elastic joint for damping load vibrations between a wheel suspension and a vehicle body, the functional hydro-elastic element having a longitudinal axis along an axial direction and a circumferential direction around the longitudinal axis, the functional hydro-elastic element comprising:
at least two rows of hydraulic chambers superimposed in the axial direction, the at least two rows comprising a first row and a second row each extending in the circumferential direction and each comprising:
at least three hydraulic chambers; and
at least one throttling duct that enables a communication of liquid between a pair of respective circumferentially adjacent hydraulic chambers of each respective first row or second row so that a variation of at least one working volume of the hydraulic chambers due to load vibrations can be balanced by enabling a flow of liquid into at least one of the other hydraulic chambers, wherein
the at least one throttling duct comprises a first system of throttling ducts formed such that the throttling ducts of the first system of throttling ducts hydraulically connect in series the hydraulic chambers of the first row of hydraulic chambers and a second system of throttling ducts formed such that the throttling ducts of the second system of throttling ducts hydraulically connect in series the hydraulic chambers of the second row of hydraulic chambers, the at least one throttling duct comprising a circumferential throttling duct formed between two adjacent rows of the at least two rows of hydraulic chambers and separated from the hydraulic chambers of one of the two adjacent rows by a first circumferential wall, from the hydraulic chambers of the other one of the two adjacent rows by a second circumferential wall, or a combination thereof, wherein the first circumferential wall, the second circumferential wall, or a combination thereof each have at least one axial opening, wherein the at least one axial opening in the first circumferential wall is facing the at least one axial opening in the second circumferential wall axially adjacent to the first circumferential wall.

2. The functional hydro-elastic element according to claim 1, wherein the functional hydro-elastic element delimits less than 48 hydraulic chambers.

3. The functional hydro-elastic element according to claim 1, wherein each of the hydraulic chambers has a circumferential width of less than or equal to about 45 degrees.

4. The functional hydro-elastic element according to claim 1, wherein the hydraulic chambers have a mean radial extension between 2 and 10 mm.

5. The functional hydro-elastic element according to claim 1, wherein the hydraulic chambers are substantially rectangular from a radial side view.

6. The functional hydro-elastic element according to claim 1, wherein a dimensional relationship between an axial extension of the hydraulic chambers and an axial extension of the at least one throttling duct is at least 5, in order to achieve a throttling effect.

7. The functional hydro-elastic element according to claim 1, wherein the hydraulic chambers of the first row and the hydraulic chambers of the second row are symmetrical with respect to a plane orthogonal to the longitudinal axis and disposed between the first row and the second row.

8. The functional hydro-elastic element according to claim 1, further comprising at least two groups of rows of hydraulic chambers, wherein each group of rows of hydraulic chambers comprises at least one row of the first row and the second row of hydraulic chambers, and the first system of throttling ducts and the second system of throttling ducts each being formed such that the hydraulic chambers of the first group of rows of hydraulic chambers are hydraulically separated from the hydraulic chambers of the second group of rows of hydraulic chambers.

9. The functional hydro-elastic element according to claim 1, wherein the volume of each hydraulic chamber of the first row of hydraulic chambers, is larger than the volume of the respective hydraulic chamber of the second row of hydraulic chambers.

10. The functional hydro-elastic element according to claim 1, wherein the damping frequency for the load vibrations in a radial direction of the first row of hydraulic chambers is lower than the damping frequency for the load vibrations in a radial direction of the second row of hydraulic chambers.

11. A functional hydro-elastic element to be lodged in a hydro-elastic joint for damping load vibrations between a wheel suspension and a vehicle body, the functional hydro-elastic element having a longitudinal axis along an axial direction and a circumferential direction around the longitudinal axis, the functional hydro-elastic element comprising:
at least two rows of hydraulic chambers superimposed in the axial direction, the at least two rows comprising a first row and a second row each extending in the circumferential direction and each comprising:
at least three hydraulic chambers and at least one of the at least two rows of hydraulic chambers comprises more than three hydraulic chambers; and
at least one throttling duct that enables a communication of liquid between a pair of respective circumferentially adjacent hydraulic chambers of each respective first row or second row so that a variation of at least one working volume of the hydraulic chambers due to load vibrations can be balanced by enabling a flow of liquid into at least one of the other hydraulic chambers, wherein
the at least one throttling duct comprises a first system of throttling ducts formed such that the throttling ducts of the first system of throttling ducts hydraulically connect in series the hydraulic chambers of the first row of hydraulic chambers and a second system of throttling ducts formed such that the throttling ducts of the second system of throttling ducts hydraulically connect in series the hydraulic chambers of the second row of hydraulic chambers, the at least one throttling duct comprising a circumferential throttling duct formed between two adjacent rows of the at least two rows of hydraulic chambers and separated from the hydraulic chambers of one of the two adjacent rows by a first circumferential wall, from the hydraulic chambers of the other one of the two adjacent rows by a second circumferential wall, or a combination thereof, wherein the first circumferential wall, the second circumferential wall, or a combination thereof each have at least one axial opening, wherein the at least one axial opening in the first circumferential wall is facing the at least one axial opening in the second circumferential wall axially adjacent to the first circumferential wall.

12. A functional hydro-elastic element to be lodged in a hydro-elastic joint for damping load vibrations between a wheel suspension and a vehicle body, the functional hydro-elastic element having a longitudinal axis along an axial direction and a circumferential direction around the longitudinal axis, the functional hydro-elastic element comprising:
at least two rows of hydraulic chambers superimposed in the axial direction, the at least two rows comprising a first row and a second row each extending in the circumferential direction and each comprising:
at least three hydraulic chambers; and
at least one throttling duct that enables a communication of liquid between a pair of respective circumferentially adjacent hydraulic chambers of each respective first row or second row so that a variation of at least one working volume of the hydraulic chambers due to load vibrations can be balanced by enabling a flow of liquid into at least one of the other hydraulic chambers, wherein
the at least one throttling duct comprises a first system of throttling ducts formed such that the throttling ducts of the first system of throttling ducts hydraulically connect in series the hydraulic chambers of the first row of hydraulic chambers and a second system of throttling ducts formed such that the throttling ducts of the second system of throttling ducts hydraulically connect in series the hydraulic chambers of the second row of hydraulic chambers, the at least one throttling duct comprising a circumferential throttling duct formed between two adjacent rows of the at least two rows of hydraulic chambers and separated from the hydraulic chambers of one of the two adjacent rows by a first circumferential wall, from the hydraulic chambers of the other one of the two adjacent rows by a second circumferential wall, or a combination thereof, wherein the first circumferential wall, the second circumferential wall, or a combination thereof each have at least one axial opening, wherein the at least one axial opening in the first circumferential wall is facing the at least one axial opening in the second circumferential wall axially adjacent to the first circumferential wall wherein the at least one throttling duct is permanently open under the load vibrations.

13. A functional hydro-elastic element to be lodged in a hydro-elastic joint for damping load vibrations between a wheel suspension and a vehicle body, the functional hydro-elastic element having a longitudinal axis along an axial direction and a circumferential direction around the longitudinal axis, the functional hydro-elastic element comprising:

at least two rows of hydraulic chambers superimposed in the axial direction, the at least two rows comprising a first row and a second row each extending in the circumferential direction and each comprising:
at least three hydraulic chambers wherein the hydraulic chambers of the first row and the hydraulic chambers of the second row are in liquid communication with each other in order to allow hydraulic filtering in direction of the longitudinal axis; and
at least one throttling duct that enables a communication of liquid between a pair of respective circumferentially adjacent hydraulic chambers of each respective first row or second row so that a variation of at least one working volume of the hydraulic chambers due to load vibrations can be balanced by enabling a flow of liquid into at least one of the other hydraulic chambers, wherein the at least one throttling duct comprises a first system of throttling ducts formed such that the throttling ducts of the first system of throttling ducts hydraulically connect in series the hydraulic chambers of the first row of hydraulic chambers and a second system of throttling ducts formed such that the throttling ducts of the second system of throttling ducts hydraulically connect in series the hydraulic chambers of the second row of hydraulic chambers, the at least one throttling duct comprising a circumferential throttling duct formed between two adjacent rows of the at least two rows of hydraulic chambers and separated from the hydraulic chambers of one of the two adjacent rows by a first circumferential wall, from the hydraulic chambers of the other one of the two adjacent rows by a second circumferential wall, or a combination thereof, wherein the first circumferential wall, the second circumferential wall, or a combination thereof each have at least one axial opening, wherein the at least one axial opening in the first circumferential wall is facing the at least one axial opening in the second circumferential wall axially adjacent to the first circumferential wall.

\* \* \* \* \*